May 15, 1923.
O. W. TRUMBULL
PACKING
Filed May 19, 1920
1,455,682
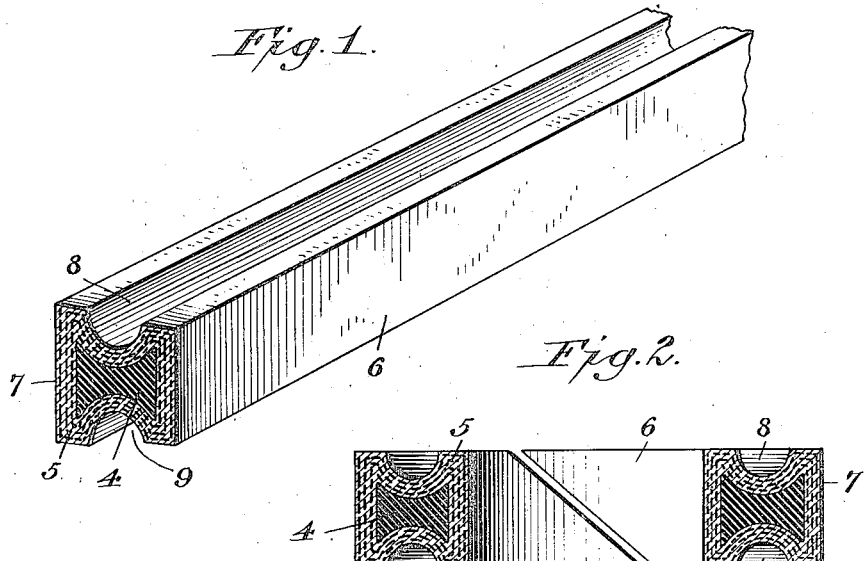
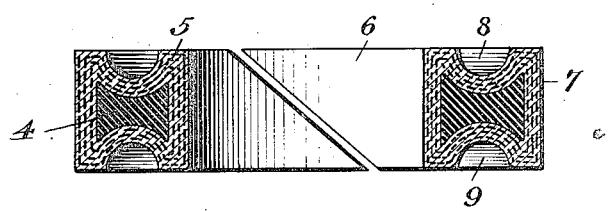
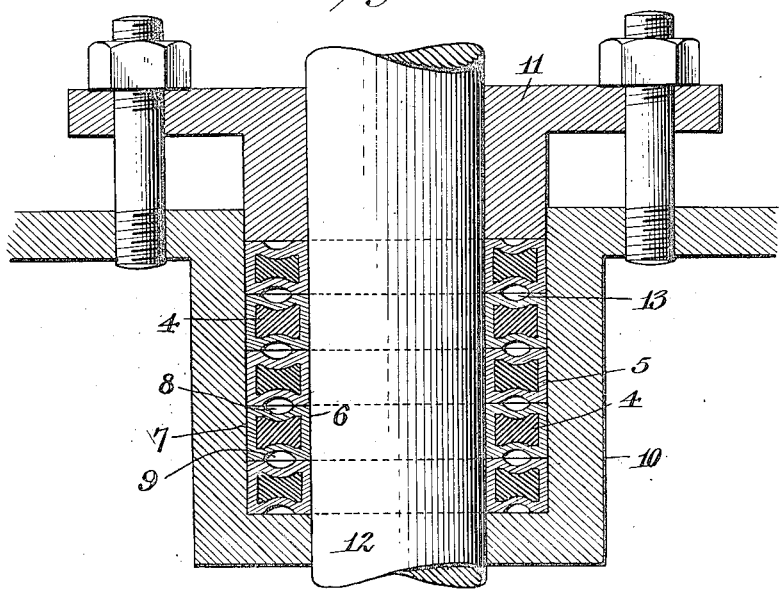
Oscar W. Trumbull,
Inventor.
By Emil Neuhart
Attorney.

Patented May 15, 1923.

1,455,682

UNITED STATES PATENT OFFICE.

OSCAR W. TRUMBULL, OF BUFFALO, NEW YORK.

PACKING.

Application filed May 19, 1920. Serial No. 382,578.

*To all whom it may concern:*

Be it known that I, OSCAR W. TRUMBULL, a citizen of the United States, residing at Buffalo, in the county of Erie and State of New York, have invented certain new and useful Improvements in Packing, of which the following is a specification.

My invention relates to packing, and more particularly to improvements in packings for stuffing boxes and the like.

The primary object of my invention is the production of a packing which is manufactured in elongated or non-circular form and adapted to be wound around a mandrel or be otherwise fashioned into spiral form, from which latter form rings may be cut for use in stuffing-boxes and the like; the packing, while in elongated or non-circular form being widened on that side which will become the outside of the spiral coils so that it will assume a cross section in which the outside is equal or substantially equal in width to that of the inside of the coils, due to the stretching of the outer portion of the lengths of the packing, while possibly compressing the extreme inner portion thereof.

A further object of my invention is the provision of a molded packing having lubricant containing grooves or ducts whereby a piston rod or other movable element surrounded by said packing will be lubricated by the lubricant in said grooves or ducts.

A further object of my invention is to construct a packing with channels formed and vulcanized into opposite sides of the packing.

A still further object is to provide a packing with a rubber or other cushion core placed in the center thereof so that the packing will be given the desired expansive properties, said packing being preferably provided with the channels above referred to so that the expansion from the packing will be absorbed when it is compressed or expanded.

A still further object of my invention is the provision of a packing in which layers of rubber friction cloth, woven, braided or other fabric are formed to shape and vulcanized in a mold of the desired shape.

With these and other objects in view the invention consists in the novel formation of packing, in the novel features of construction, and in a packing having structural features whereby the aforementioned and other objects with their resultant advantages are secured, all as will be hereinafter set forth and particularly pointed out in the subjoined claims.

In the drawings:—

Fig. 1 is a sectional perspective view of a short length of packing material illustrating my preferred structural formation preparatory to forming or curving the same into spiral form.

Fig. 2 is a cross sectional view through a packing ring cut from a spirally wound length of the packing material shown in Fig. 1, showing the manner in which the packing material, after being curved, assumes a rectangular or substantially rectangular form, with the outer surface of the ring equaling in width that of the inner surface.

Fig. 3 is a longitudinal section through a stuffing box having a piston rod therein and my improved packing in ring form inserted within the stuffing box and slightly compressed.

While I have illustrated my improved packing with a cushion core that will give the necessary expansive properties to the packing, it is nevertheless my intention that certain features of my invention may be embodied within a packing of this kind without resorting to the use of a cushion core, and while I have also shown my invention constructed of layers of rubber friction-cloth or woven or braided fabric, suitably built around a center core and vulcanized in a mold to the desired shape, it is nevertheless to be understood that certain features of my invention may be embodied in a packing of this kind built up from laminations of rubber and duck, or any other combination of material.

A packing of this kind embodying all the features and advantages of my invention comprises a core 4, preferably of rubber, serving as a center cushion and an exterior portion or covering 5 for said core of desired thickness, in the form of rubber friction-cloth, woven or braided fabric of flax, asbestos or any other material suitable for packing purposes. The cushion core 4 as it may be termed, may be round, square, oblong or have any other cross sectional formation, or it may initially have the shape shown in the drawings, with opposite faces provided with concaved grooves. Around said core, a sheet or separate layers of the selected cloth, fabric or other material is placed, thus forming the exterior portion or covering 5 of the packing. The packing rudimentarily formed is then placed within a mold of the desired shape and the whole vulcanized; proper pressure of course being applied to the parts of the mold to give the packing the desired exterior outline.

The packing material is constructed in non-circular form, preferably in straight lengths with the inner surface 6, which is that surface adapted to lie in contact with the piston rod, somewhat narrower than the outer surface 7, which is that surface adapted to lie in contact with the confining wall of a stuffing box. While the widening of my packing material at one side may be carried out in various ways, I preferably form the packing with concaved grooves 8, 9 in opposite sides thereof, or in what I term the upper and lower sides, and by employing grooves of this type, the packing material at one side of the grooves may be made wider than the packing at the other side thereof, as clearly shown in Fig. 1.

The cushion core 4 need not initially be formed to the shape shown in Fig. 1, since if it is otherwise shaped and placed within a mold with the covering or exterior portion around it, it will be compressed vertically and expanded laterally in opposite directions when forming the opposite grooves 8, 9, and thus assume the formation shown in Fig. 1 of the drawing, or substantially such formation.

With the packing material constructed as shown in Fig. 1, it may be said to be of trapezoid formation in cross section, and when so constructed is adapted to be formed into spiral form by winding the same around a suitable mandrel. From the material thus spirally formed, rings of the diameter needed may be cut, such rings being shown in use in Fig. 3. When formed spirally, the packing material assumes a circular formation, the curving of the packing material shown in Fig. 1 into spiral form will cause stretching of the outer portion of the packing material so that the outer surface 7 will be equal in width to that of the inner surface, or substantially so, thereby giving the material a rectangular formation in cross section; that is to say, the exterior surface of each of the coils of the spirally formed packing will be the same width, or substantially so, as the interior surface of the ring. When cutting the spirally-formed packing material into ring form and placing the rings in a stuffing box, illustrated for example in Fig. 3 and designated by the numeral 10, said rings will have the upper and lower surfaces bearing fully and perfectly, one against another, and the gland 11 will also have full and perfect bearing against the upper surface of the uppermost ring, while the lowermost ring will have full and perfect bearing against the inner or lower wall of the stuffing box. Therefore, when pressure is applied against the packing, due to the tightening of the gland, the packing rings will be compressed evenly and caused to expand radially or laterally in opposite directions to substantially the same degree, thereby necessitating considerably less pressure in order to assure a secure packing around the piston rod 12, than is ordinarily given to packing rings formed of packing material which is of rectangular formation in cross section before being fashioned into spiral form and which when coiled into spiral form or fashioned into ring form will cause the outer portion of the material to stretch while the inner portion is compressed or buckles upon itself, with the result that when the packing is ready to be inserted into the stuffing box, the outer portions of the rings are of less height than the inner portion.

Packing material having the outer portions of rings of different heights than the inner portions create a condition in which the opposing faces of the rings bear against each other only at the wide parts and this necessitates the application of greater pressure and creates more or less distortion of the interior of the packing material, in addition to creating rubbing action or friction on their opposing faces, with the result that unequal pressures are applied to different portions of the piston rod and the surrounding or confining wall of the stuffing box, thereby causing considerable wear and tear and requiring continual adjustments of the gland of the stuffing box in order to prevent leakage, and also frequent replacements, all of which is eliminated or greatly minimized in the construction provided by my invention.

It is to be understood that when packing rings of the kind shown in Fig. 2, are placed within a stuffing box, as shown for example in Fig. 3, certain of the grooves of the rings are brought into registration and face each other, thus providing between the rings, circular ducts or spaces 13 in which graphite and oil or any other suitable lubricant may be placed to lubricate the piston rod, such lubricating material being directed inwardly against the rod by being forced out from between the rings.

By employing a packing with a rubber or other cushion core, it gives the necessary expansive properties so that it will hold firmly against the piston rod and the wall of the stuffing box, and when pressure is relieved will measurably resume its normal condition; and, when combining the grooves 8 and 9 with the rubber or cushion core, the expansion from the packing will be absorbed thereby when the packing is compressed or expanded. It is therefore apparent that the cushion or core may be employed independently of the grooves at opposite sides of the packing material, or that such grooves may be employed in a packing material in which the rubber or cushion core is omitted, each serving its separate functions independently, but when combined, adding advantages not possessed individually by either.

It is also apparent that the packing may be otherwise shaped in cross section than herein shown, and that the grooves may be placed in all sides of the packing or at different points around the packing.

Where in the claims the word "circular" is used, it is intended to include a packing of ring form, a spiral packing, or any other packing adapted to be wound or placed around a piston rod or other element to prevent leakage along the same.

Having thus described my invention, what I claim is:—

1. A packing adapted to be wound or otherwise formed into circular form and having its outer portion wider than its inner portion so that when wound or otherwise formed into circular form the outer portion will become stretched to bring the upper and lower surfaces thereof substantially at right angles to the element around which it is placed.

2. A packing formed with that portion along one side wider than the portion along the other side thereof so that when wound or curved into circular form it will be substantially rectangular in formation.

3. A packing initially formed in non-circular shape having a substantially trapezoid cross-sectional formation, said packing being adapted to be wound or curved into circular form while having the wider of the two parallel sides at the outside so that when curved or coiled the packing will assume a substantially rectangular outline in cross section.

4. A packing having a cushion core, and covering material vulcanized around said cushion core, said packing being initially formed in non-circular shape with two opposite parallel sides and with one of said parallel sides wider than the other, said packing being adapted to be wound or curved into circular form with the wider side at the outside so that when shaped into circular form the outer side will conform in width to the width of the inner side, or substantially so.

5. A packing initially formed non-circular and having grooves along opposite sides with the packing wider at one side of said grooves than the other, said packing being adapted to be wound or otherwise shaped into circular form with the wider portion at the outside while so shaping the same so as to stretch the wider portion and make it the same or substantially the same width as the narrow portion.

6. A packing having a cushion core, and suitable covering material around said cushion core vulcanized together and to said core with grooves in opposite sides of the packing.

7. A packing having a cushion core with grooves at opposite sides thereof, covering material having layers capable of being vulcanized together and to said core, said packing providing exterior grooves in opposite sides and having the portion of the packing at one side of the grooves wider than the other so that when shaped into circular form the portions at opposite sides of the grooves will be of equal width or substantially so.

In testimony whereof I affix my signature.

OSCAR W. TRUMBULL.